United States Patent

Berndt

[11] Patent Number: 6,074,753
[45] Date of Patent: Jun. 13, 2000

[54] DRAWN POLYESTER YARN FOR REINFORCEMENT OF ELASTIC STRUCTURES

[75] Inventor: Kurt-Guenter Berndt, Koenigsbrunn, Germany

[73] Assignee: Hoechst Trevira GmbH & Co., Frankfurt, Germany

[21] Appl. No.: 09/009,183

[22] Filed: Jan. 20, 1998

[30] Foreign Application Priority Data

Jan. 17, 1997 [DE] Germany .................. 197 01 550

[51] Int. Cl.⁷ .................. D02G 3/00; D06M 13/165
[52] U.S. Cl. .................. 428/395; 8/115.6; 8/DIG. 4; 252/8.61; 252/8.81; 252/8.84; 427/389.9; 427/393.3; 428/480
[58] Field of Search .................. 252/8.81, 8.84, 252/8.61; 8/115.6, DIG. 4; 427/389.9, 393.3; 428/395, 480

[56] References Cited

U.S. PATENT DOCUMENTS

| | | | |
|---|---|---|---|
| 3,793,425 | 2/1974 | Arrowsmith | 264/210 |
| 4,044,189 | 8/1977 | Arrowsmith | 428/295 |
| 4,438,178 | 3/1984 | Powers | 428/289 |
| 4,929,769 | 5/1990 | Anderson et al. | 568/614 |

FOREIGN PATENT DOCUMENTS

| | | |
|---|---|---|
| 0 395 432 | 10/1990 | European Pat. Off. . |
| 0 637 602 | 2/1995 | European Pat. Off. . |
| 7-70819 | 8/1995 | Japan . |

OTHER PUBLICATIONS

Donald A. Schiffler, Yarns for Tyres and Industrial Uses, pp. 102.–104.

*Primary Examiner*—Anthony Green
*Attorney, Agent, or Firm*—Foley & Lardner

[57] ABSTRACT

Drawn polyester yarn of enhanced strength and improved adhesion properties for reinforcement of elastic structures, such as tires, conveyor belts and the like, is obtained on treatment, prior to drawing, with a water-free or a low water fiber finish comprising an adhesion-promoting substance comprising a halogenated polyether containing at least one 2-halomethyloxyethylene unit and a 2,3-dihydroxypropyl end group.

15 Claims, No Drawings

DRAWN POLYESTER YARN FOR REINFORCEMENT OF ELASTIC STRUCTURES

BACKGROUND OF THE INVENTION

1. Field of the Invention

This invention relates to drawn polyester yarn of enhanced strength and improved adhesion properties which is used for reinforcing elastic structures such as tires, conveyor belts and the like.

2. Description of Related Art

Elastic structures such as tires, conveyor belts and the like have long been reinforced using yarns made of a wide variety of materials. Initially, the reinforcements used were made of rayon and polyamide, but over time polyester fiber became more and more important, too. To improve the suitability of polyester fiber for use as reinforcing material, both the fiber itself and the adhesive material have been further developed. For instance, the hydrolysis resistance of polyethylene terepthalate has been improved by increasing the molecular weight and reducing the carboxyl end group content. Yarn strength improved as spinning and drawing technology improved.

The adhesion between the yarn material and the elastic material such as rubber, Caoutchouc, etc. improved as the result of the development of a whole series of dip systems. Many known adhesives are based on epoxy compounds, as described for example in U.S. Pat. No. 3,793,425 and in U.S. Pat. No. 4,044,189. U.S. Pat. No. 4,438,178, for example, teaches ethers or esters based on epichlorohydrin and polyhydric alcohols or polycarboxylic acids. These compounds again contain epoxy groups.

Adhesives without epoxy groups are a recent development. For instance, EP-A1-0 637 602 discloses organic compounds containing 2-halomethyloxyethylene units, secondary hydroxyl groups, and ester groups derived from organic acids. These compounds are essentially free of halohydrin and epoxy groups and are used, for example, for improving the adhesion of fibers composed of polyamides, polyester, carbon, etc.

EP-A2-0 395 432, finally, describes polyesters which contain at least one 2-halomethyloxyethylene unit and a 2,3-dihydroxypropyl end group and which are likewise essentially free of epoxy groups and halohydrin groups. The aforementioned compounds which are free of epoxy and halohydrin groups are applied to the fibers to be treated as aqueous emulsions or aqueous solutions having a considerable water content.

Japanese Kokai 7-70819 describes a process for drawing undrawn polyester yarn spun at high speed wherein the yarn is taken off and treated before drawing with an oily fiber finish having a water content of not more than 10%. The yarn is then subjected to multistage drawing at different temperatures. The yarn thus produced can be used, for example, in the form of a cord for reinforcing rubber articles.

This Japanese patent application does not teach the improved adherence to rubber, and the strengths obtained are below those achieved according to the present invention. Nor does said reference motivate one skilled in the art in any way to use compounds as improved adhesives, as is the case with the present invention.

SUMMARY OF THE INVENTION

Although numerous ways are known to produce a polyester yarn having good mechanical properties and then to provide it with adhesives to improve adhesion between the fiber and the elastic material, there continues to be a need for polyester yarn which has improved mechanical properties and good adherence to the elastic material. It is, therefore, an object of the present invention to provide a polyester yarn which has enhanced strength and improved adhesion properties in the reinforcement of elastic structures such as tires, conveyor belts and the like and which is simple and economical to produce and whose process of production is toxicologically safe.

This object is achieved by drawn polyester yarn of enhanced strength and improved adhesion properties for reinforcement of elastic structures such as tires, conveyor belts and the like, said yarn having applied to it prior to the drawing process a fiber finish which is water-free or has a low water content and which comprises an adhesion-promoting substance comprising a halogenated polyether which contains at least one 2-halomethyloxyethylene unit and a 2,3-dihydroxypropyl end group and which is essential free of epoxy groups and halohydrin groups and optionally further comprising customary additives.

The present invention further provides a process for producing such polyester yarn, the use of the yarn for reinforcing elastic structures and a fiber finish composition for application to polyester yarn prior to drawing, for example in the course of the spin-draw process.

DETAILED DESCRIPTION OF A PREFERRED EMBODIMENT

The adhesion-promoting substances providing access to the spin-drawn polyester yarn of the invention are known per se and are described, for example, in U.S. Pat. No. 4,929,769 and EP-A2-0 395 432, the disclosures of which are expressly incorporated herein by reference.

The adhesion-promoting substances applied to the polyester yarn can be represented by the following chemical formula:

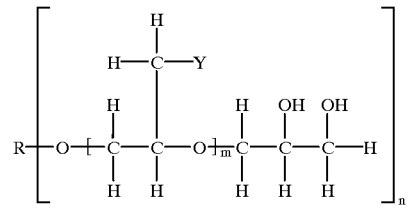

where R is a radical of an etherified organic polyhydroxy compound, n is from 2 to 8 and indicates the number of ether chains emanating from R, m is from 1 to 7, and y denotes chlorine, bromine or iodine or a mixture thereof.

It is not necessary for all the hydroxyl groups of the etherified organic polyhydroxy compounds to be etherified. It is perfectly possible, when glycerol is the polyhydroxy compound, for only two of the hydroxyl groups to be etherified and one free hydroxyl group still to be present. If, for example, sorbitol is the polyhydroxy compound, from one to four hydroxy groups may remain unetherified without problems.

The applied adhesion-promoting substance is preferably derived from glycerol as polyhydroxy compound.

Adhesion promoters used according to the present invention which are derived from glycerol as preferred polyhydroxy compound may advantageously be substances of the formula II

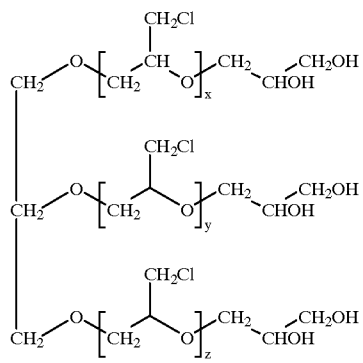

x is preferably 1 to 3, y is preferably 0 to 2, and z is preferably 1 to 3, wherein x+y+z is in general, 3 to 5, preferably 3.5 to 4.5 and in particular, 4.2.

The applied fiber finish, in addition to the adhesion-promoting substance, may comprise customary additives such as lubricants, surfactants and/or antistats, viscosity regulators, activators. It further preferably comprises a small amount of water.

The fiber finish preferably includes

A) a conventional base comprising
  A1) lubricants
  A2) surfactants and
  A3) antistats,
  these constituents being in particular:
  A1) ester oil
  A2) ethoxylated fatty acids and
  A3) organic phosphoric esters.
A further constituent is preferably
B) a viscosity regulator (diluent), which is a dialkyl polyglycol ether in particular.
Essential to the invention is
C) an adhesion-promoting substance defined above.
It is preferably a hydrolyzed glycerol polyglycidyl ether.
In addition there is preferably present
D) a rubber adhesion activator, especially a potassium salt of an inorganic or organic acid, preferably potassium acetate.
A minimum amount of
E) water
is generally needed as a solvent in the event the activator D is included.

It is preferable to keep the water content in the fiber finish as low as possible, and in a preferred embodiment, the amount of water is an amount sufficient to dissolve component D if it is included. If D is not included, the fiber finish can be free of water.

The proportions of the components of the fiber finish are generally as follows:
A) 85 to 20% by weight, preferably 58% by weight
B) 5 to 40% by weight, preferably 28% by weight
C) 4 to 25% by weight, preferably 10% by weight
D) 0.5 to 2.5% by weight, preferably 1.0 to 3.0% by weight
E) 1.0 to 5.0% by weight, preferably 1.5 to 3.0% by weight.

The substance C) used can be characterized by the structural formula

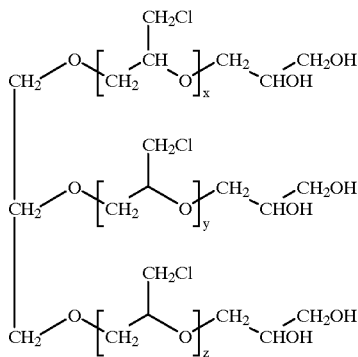

x is preferably 1 to 3, y is preferably 0 to 2, and z is preferably 1 to 3, wherein x +y +z is in general, 3 to 5, preferably 3.5 to 4.5 and in particular, 4.2.

The high strength filaments produced using the fiber finish of the invention are characterized by the following data:
  tenacity>80.0 cN/dtex, preferably>82.0 cN/dtex, coupled with an elongation at break of 10 to 12%, preferably 11%, and a 200° hot air shrinkage of not more than 14%. Tenacity in some embodiments is >80.0 cN/tex.

The following examples are intended as illustrations and should not be construed as limiting the invention in any way.

EXAMPLE

A fiber finish is prepared from:

| | |
|---|---|
| A) | 58% by weight of the commercial product AFILAN TEF from Hoechst AG |
| B) | 28% by weight of the commercial product SYNTHACID 383 from Dr. Bohme KG |
| C) | 10% by weight of the commercial product LUBRIL 17040 from Rhone-Poulenc |
| D) | 1.3% by weight of potassium acetate, and |
| E) | 2.7% of water. |

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

Preparation

A solution is prepared from 1.3 kg of potassium acetate and 2.7 kg of demineralized water. A stirred tank is charged with 28.0 kg of Synthacid 383, and 4.0 kg of the potassium acetate solution prepared are stirred in. Subsequently the weighed-out amount of 10.0 kg of Lubril 17040 is added to the Synthacid mixture, which is followed by stirring for about 60 min until the product is fully homogenized.

Thereafter 58.0 kg of Afilan TEF are mixed in. The total mixture is subsequently stirred for 30 min.

A high strength filament yarn was produced from polyethylene terephthalate on a spin-draw machine with twostage drawing using this fiber finish, under the following conditions.

Machine setting

| Nominal linear density | | dtex | 1100 |
|---|---|---|---|
| Filament count | | | 200 |
| Spinning takeoff | | m/min | 2500 |
| Speed | Inlet duo | m/min | 408 |
| | Duo 1 | m/min | 412 |
| | Duo 2 | m/min | 1448 |
| | Duo 3 | m/min | 2541 |
| | Duo 4 | m/min | 2541 |
| Draw ratio | | | 1:6.23 |
| Temperatures | Duo 1 | ° C. | 115 |
| | Duo 2 | ° C. | 125 |
| | Duo 3 | ° C. | 223 |
| | Duo 4 | ° C. | 120 |
| Fiber finish add-on in % by weight on weight of yarn | | % | 0.52 |

The following yarn parameters were obtained:

| DIN EN ISO 2062 breaking force | N | 94.7 |
|---|---|---|
| DIN EN ISO 2062 tenacity | cN/tex | 84.1 |
| Elongation at break | % | 11.0 |
| Extension at stated load (54 cN/tex) | % | 5.52 |
| 200° C. hot air shrinkage | % | 14.0 |
| Latex adhesion | N/cm | 244 |

Production of thread:

A 3 S130/Z130 thread is produced in 2 steps by ring spinning:

a) production of a single yarn twisted with 130 turns/m in the S-direction b) production of the thread from 3 single yarns with 130 turns/m in the Z-direction.

Latexing:

The thread is given a rubber-friendly finish by means of a resorcinolformaldehyde-latex (RFL) dip. The dip is prepared from:

40 g of Bunatex VP 2210 (40% strength) from Hois AG
45 g of Penacolite B1-A (50% strength) from Inspec (USA)
12 ml of concentrated ammonia (about 25% strength)
18 ml of formaldehyde (about 30% strength)
510 ml of distilled water.

In one operation, the thread is dipped in the RFL bath, the dipped thread dried and the RFL resin cured (230° C., 120 s) while at the same time the thread is tensilized (thread tension 700 cN).

Preparation of test specimen:

The latexed thread is vulcanized into a standard rubber mixture composed of 100% of natural rubber and customary rubber additives (Hoechst AG). Rubber strips 10 mm×300 mm in size and 3 mm in thickness are placed into vulcanizing mold, and the thread is placed on top in a 30-fold parallel arrangement to leave about 20 mm rubber-free thread ends and covered over with rubber strips 6 mm in thickness.

Vulcanization:

Vulcanizing is effected in a hydraulic vulcanizing press from Wickert & Söhne at 143° following preheating at 3 kN/cm² for 45 min. The sample is then allowed to cool down and made ready for the test.

Determination of adhesion:

The adhesion test is carried out on a Zwick universal tester under the following conditions:

| Clamped length | 140 mm |
|---|---|
| Rate of extension | 300 mm/min |
| Number of tests | 30 |

A specially fabricated upper clamp is used to hold the specimen without slippage. The free thread end is placed into the lower wrap clamp. The average value is reported as the latex adhesion.

Comparative example:

| (1) 4.5% | of BK 2104, an ester oil from Henkel KG |
|---|---|
| (2) 4.5% | of STANDOPOL 1100A, an emulsifier with antistat, likewise Henkel |
| (3) 3.0% | of HOE T 1812, a further emulsifier, Hoechst AG |
| (4) 2.8% | of LUBRIL 17040, Rhone-Poulenc |
| (5) 0.2 | of potassium bicarbonate |
| (6) 85.0% | of water. |

Components (1) to (4) are homogenized in succession at 50° C. by stirring and then stirred for a further 30 min. Thereafter this full strength batch is adjusted to 15% with demineralized water and emulsified. KHC03 is added to the ready-prepared emulsion with stirring.

A yarn was produced with this fiber finish on the same spin-draw machine as mentioned above:

Machine setting:

| Nominal linear density | | dtex | 1100 |
|---|---|---|---|
| Filament count | | | 200 |
| Spinning takeoff | | m/min | 2100 |
| Speed | Inlet duo | m/min | 370 |
| | Duo 1 | m/min | 375 |
| | Duo 2 | m/min | 1293 |
| | Duo 3 | m/min | 2135 |
| | Duo 4 | m/min | 2102 |
| Draw ratio | | | 1:5.76 |
| Temperatures | Duo 1 | ° C. | 115 |
| | Duo 2 | ° C. | 125 |
| | Duo 3 | ° C. | 233 |
| | Duo 4 | ° C. | 120 |
| Fiber finish add-on | | % | 0.55 |

The following yarn parameters were obtained:

| DIN EN ISO 2062 breaking force | N | 84.0 |
|---|---|---|
| DIN EN ISO 2062 tenacity | cN/tex | 75.0 |
| Elongation at break | % | 14.2 |
| Extension at stated load (54 cN/tex) | % | 7.2 |
| 200° C. hot air shrinkage (according to DIN 53886 P3) | % | 12.5 |
| Latex adhesion | N/cm | 223 |

Owing to the poorer running properties with this aqueous fiber finish, this comparative yarn could not be produced with such high process settings (takeoff speed, draw ratio).

Customary polyester yarns, especially based on polyethylene terephthalate; are suitable for application of a low water fiber finish as per the invention prior to drawing. It is also possible to use yarns based on copolyesters. Similarly, polyesters modified by additives can be used. POY is particularly suitable.

Note that the indicated compounds employed in the examples can be generally described as follows:

| | |
|---|---|
| AFILAN TEF | mixture of ester oil and surfactants |
| SYNTHACID 383 | polyglycol dialkyl ether |
| LUBRIL 17040 | hydrolyzed glycerol epoxide |
| BUNATEX VA2210 | aqueous dispersion of a styrene-butadiene-vinylpyridine terpolymer |
| PENACOLITE B1-A | resorcin resin solution |
| STANDOPOL 1100A | mixture of antistatics and non-ionic emulsifiers |
| HOE T 1812 | fatty acid polyglycol ester |
| BK 2104 | pentaerythrite fatty acid ester |

Alternate components corresponding to the above categories can be used as substitutes, if necessary or desirable.

It is particularly surprising that the drawn polyester of the invention has not only enhanced strength but also improved adhesion properties when a low water preparation of the adhesion-promoting substance is applied to it prior to drawing. Compared with drawn polyester yarn produced using aqueous preparation, the strength is up by 12% and the adhesion by 10%.

The drawn polyester yarn of the invention is very economical to produce on high speed machinery as well. There are no toxicological problems. Production is very economical since it is not necessary to prepare emulsions.

Other embodiments of the invention will be apparent to those skilled in the art from consideration of the specification and practice of the invention disclosed herein. It is intended that the specification be considered as exemplary only, with the true scope and spirit of the invention being indicated by the following claims.

The Priority Document German Application No. 197 01 550.6 filed Jan. 17, 1997, is incorporated herein in its entirety by reference. In addition, all documents mentioned herein are expressly incorporated in their entirety by reference. As used herein and in the following claims, singular articles such as "a", "an", "the" and "one" are intended to refer to encompass singular or plural.

What is claimed is:

1. Drawn polyester yarn of enhanced strength and improved adhesion properties for reinforcement of elastic structures, said yarn having applied to it prior to being drawn a fiber finish which is water-free or has a water content of below 10% by weight, based on the total weight of the fiber finish, said fiber finish comprising a base substance (A) and an adhesion-promoting substance comprising a halogenated polyether which contains at least one 2-halomethyloxyethylene unit and a 2,3dihydroxypropyl end group and which is essentially free of epoxy groups and halohydrin groups, said fiber finish optionally further comprising one or more additives selected from the group consisting of viscosity regulators, lubricants, rubber adhesion activators, surfactants and antistatic agents, and wherein said drawn polyester yarn has a tenacity of greater than 80 cN/tex.

2. The drawn polyester yarn of claim 1, wherein the water content of the fiber finish is ≦5% by weight, based on the total weight of the fiber finish.

3. The drawn polyester yarn of claim 1, wherein the adhesion-promoting substance is applied as a solution in a polyglycol ether.

4. The drawn polyester yarn of claim 1, wherein the fiber finish which is applied comprises from 5 to 25% by weight, based on the total weight of the fiber finish, of the halogenated polyether.

5. The drawn polyester yarn of claim 1, produced by a spin-draw process.

6. A drawn polyester yarn according to claim 1, wherein said adhesion-promoting substance is of the following formula:

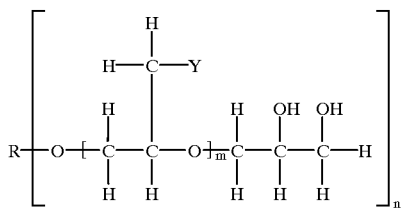

where R is a radical of an etherified organic polyhydroxy compound, n is from 2 to 8 and indicates the number of ether chains emanating from R, m is from 1 to 7, and y denotes chlorine, bromine or iodine or a mixture thereof.

7. A drawn polyester yarn according to claim 1, wherein said fiber finish further comprises:
85–20% of said base substance A;
4–25% of said adhesion—promoting substance; and
one or more of the following additives
B) 5–40% of a viscosity regulator; or
D) 0.5–2.5% of a rubber adhesion activator and 1.0–5.0% water E), all percentages being by weight based on the weight of said fiber finish.

8. A drawn polyester yarn according to claim 7, wherein said adhesion-promoting substance is of the following formula:

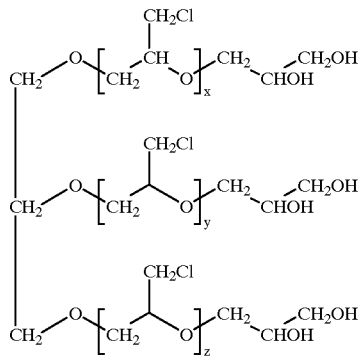

wherein x is 1 to 3, y is 0 to 2, and z is 1 to 3, and wherein x +y +z is 3 to 5.

9. A drawn polyester yarn according to claim 1, wherein said base substance A is selected from the group consisting of a lubricant, a surfactant and an antistatic agent.

10. A fiber finish composition for application to polyester yarn prior to drawing, said fiber finish being water-free or having a water content of below 10% by weight, based on the total weight of the fiber finish and comprising a base substance (A) and an adhesion-promoting substance comprising a halogenated polyether which contains at least one 2-halomethyloxyethylene unit and a 2,3-dihydroxproylene end group and which is essentially free of epoxy groups and halohydrin groups, and said fiber finish optionally further comprising one or more additives selected from the group comprising viscosity regulators, lubricants, rubber adhesion activators, surfactants and antistatic agents.

11. A fiber finish composition as claimed in claim 10, wherein said adhesion-promoting substance is of the following formula:

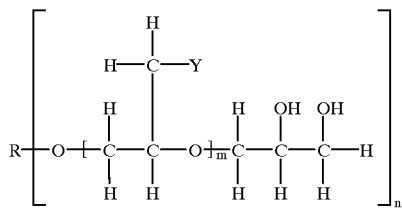

where R is a radical of an etherified organic polyhydroxy compound, n is from 2 to 8 and indicates the number of ether chains emanating from R, m is from 1 to 7, and y denotes chlorine, bromine or iodine or a mixture thereof.

12. A fiber finish composition according to claim 10 comprising:

85–20% of said base substance A;

4–25% of said adhesion-promoting substance; and one or more of the following additives:

B) 5–40% of a viscosity regulator; or

D) 0.5–2.5% of a rubber adhesion activator and 1.0–5.0% of water E), all percentages being by weight based on the weight of said fiber finish.

13. A fiber finish composition according to claim 12, wherein said adhesion-promoting substance is of the following formula:

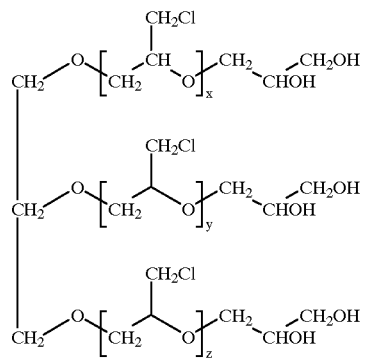

wherein x is 1 to 3, y is 0 to 2, and z is 1 to 3, and wherein $x + y + z$ is 3 to 5.

14. A fiber finish composition according to claim 10, wherein said base substance A is selected from the group consisting of a lubricant, a surfactant and an antistatic agent.

15. A process for producing a polyester yarn, which comprises applying to the yarn prior to drawing a fiber finish which is water-free or has a water content of below 10% by weight, based on the total weight of the fiber finish and which comprises a base substance (A) and an adhesion-promoting substance comprising a halogenated polyether which contains at least one 2-halomethyloxyethylene unit and a 2,3-dihydroxypropylene end group and which is essentially free of epoxy groups and halohydrin groups, and said fiber finish optionally further comprising one or more additives selected from the group consisting of viscosity regulators, lubricants, rubber adhesion activators, surfactants and antistatic agents.

* * * * *